US011977753B2

(12) United States Patent
Poosapalli et al.

(10) Patent No.: US 11,977,753 B2
(45) Date of Patent: May 7, 2024

(54) BIOS NVRAM STORAGE EXTENSION SYSTEM AND METHOD FOR SECURE AND SEAMLESS ACCESS FOR VARIOUS BOOT ARCHITECTURES (71) Applicant: Dell Products, L.P., Round Rock, TX (US)

(72) Inventors: Karunakar Poosapalli, Siddipet (IN); Shekar Babu Suryanarayana, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 191 days.

(21) Appl. No.: 17/659,034

(22) Filed: Apr. 13, 2022

(65) Prior Publication Data
US 2023/0333755 A1  Oct. 19, 2023

(51) Int. Cl.
*G06F 3/06* (2006.01)
*G06F 9/4401* (2018.01)

(52) U.S. Cl.
CPC .......... *G06F 3/0631* (2013.01); *G06F 3/0604* (2013.01); *G06F 3/0679* (2013.01); *G06F 9/4401* (2013.01)

(58) Field of Classification Search
CPC .... G06F 3/0631; G06F 3/0604; G06F 3/0679; G06F 9/4401
See application file for complete search history.

(56) References Cited

U.S. PATENT DOCUMENTS

| | | | | |
|---|---|---|---|---|
| 9,830,457 | B2* | 11/2017 | Vidyadhara | G06F 21/575 |
| 10,599,849 | B2* | 3/2020 | Nijhawan | G06F 9/4403 |
| 11,416,615 | B2* | 8/2022 | Hayes | G06F 21/74 |
| 11,500,994 | B2* | 11/2022 | Khatri | H04L 9/30 |
| 11,520,596 | B2* | 12/2022 | Thom | G06F 21/572 |
| 2002/0194313 | A1* | 12/2002 | Brannock | H04L 67/34 717/176 |
| 2018/0150302 | A1* | 5/2018 | Chuang | G06F 13/4282 |
| 2019/0179628 | A1* | 6/2019 | Bulusu | G06F 9/4401 |
| 2022/0092203 | A1* | 3/2022 | Khatri | G06F 21/64 |

* cited by examiner

Primary Examiner — Tammara R Peyton
(74) Attorney, Agent, or Firm — Fogarty LLP (57) ABSTRACT Systems and methods for providing a storage extension system and method for secure and seamless access by various boot architectures are described. In some embodiments, an Information Handling System (IHS) may include a processor and a BIOS coupled to the processor, the BIOS having program instructions that, upon execution, cause the IHS to receive a request to access a bios storage region of the IHS from a driver, determine whether the device associated with the driver is a platform boot device such that when the boot device is a platform boot device, facilitate access to a native bios storage region of the bios storage region by the driver, and when the boot device is not a platform boot device, facilitate access to an extended bios storage region of the bios storage region by the driver.

17 Claims, 10 Drawing Sheets

| NVRAM VARIABLE INDEX (512A) | VARIABLE NAME (512B) | GUID (512C) | NATIVE VARIABLE OR EXTENDED NVRAM PARTITION (512D) |
|---|---|---|---|
| 0 | DEPLOYED MODE | XXXX-XX-XX | 0 (NATIVE) |
| 1 | SETUP MODE | XXXX-XX-XX | 0 (NATIVE) |
| 2 | SECURE BOOT | | |
| 3 | PKDEFAULT | | |
| 4 | | | |
| ⋮ | | | |
| N | | | |

FIG.5A

| NVRAM VARIABLE INDEX | VARIABLE NAME | GUID | NATIVE VARIABLE OR EXTENDED NVRAM PARTITION |
|---|---|---|---|
| 0 | CONIN | XXXX-XX-XX | 1 (EXTENDED NVRAM) |
| 1 | DEBUG CONFIG DATA | XXXX-XX-XX | 1 (EXTENDED NVRAM) |
| 2 | BOOTING DEVICE TYPE INFO | | |
| 3 | CURRENT POLICY | | |
| 4 | | | |
| ⋮ | | | |
| N | | | |

| MNEMONIC | BYTE OFFSET | BYTE LENGTH | DESCRIPTION |
|---|---|---|---|
| TYPE | 0 | 1 | TYPE 0x01 - HARDWARE DEVICE PATH<br>TYPE 0x02 - ACPI DEVICE PATH<br>TYPE 0x03 - MESSAGING DEVICE PATH<br>TYPE 0x04 - MEDIA DEVICE PATH<br>TYPE 0x05 - BIOS BOOT SPECIFICATION DEVICE PATH<br>TYPE 0x7F - END OF HARDWARE DEVICE PATH |
| SUB-TYPE | 1 | 1 | SUB-TYPE-VARIES BY TYPE.(SEE TABLE 45.) |
| LENGTH | 2 | 2 | LENGTH OF THIS STRUCTURE IN BYTES. LENGTH IS 4+N BYTES |
| SPECIFIC DEVICE PATH DATA | 4 | N | SPECIFIC DEVICE PATH DATA. TYPE AND SUB-TYPE DEFINE TYPE OF DATA. SIZE OF DATA IS INCLUDED IN LENGTH |

BIOS NVRAM STORAGE EXTENSION SYSTEM AND METHOD FOR SECURE AND SEAMLESS ACCESS FOR VARIOUS BOOT ARCHITECTURES

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In most IHSs, low-level code is used as an intermediary between hardware components and the Operating System (OS), as well as other high-level software. In some IHSs, this low-level code is known as the Basic Input/Output System (BIOS). The BIOS provides a set of software routines that allow high-level software to interact with hardware components using standard calls. Because of certain limitations of the original BIOS, a new specification for creating code that is responsible for booting the IHS has been developed that is called the Extensible Firmware Interface (EFI) Specification, and which has been extended by the Unified Extensible Firmware Interface Forum (UEFI).

The EFI Specification describes an interface between the OS and the system firmware. In particular, the EFI Specification defines the interface that platform firmware must implement and the interface that the OS may use in booting. The EFI Specification also specifies that protocols should be provided for EFI drivers to communicate with each other. An EFI protocol is an interface definition provided by an EFI driver. The EFI core provides protocols for allocation of memory, creating events, setting the clock, and the like.

SUMMARY

Systems and methods for providing a storage extension system and method for secure and seamless access by various boot architectures are described. In some embodiments, an Information Handling System (IHS) may include a processor and a BIOS coupled to the processor, the BIOS having program instructions that, upon execution, cause the IHS to receive a request to access a bios storage region of the IHS from a driver, determine whether the device associated with the driver is a platform boot device such that when the boot device is a platform boot device, facilitate access to a native bios storage region of the bios storage region by the driver, and when the boot device is not a platform boot device, facilitate access to an extended bios storage region of the bios storage region by the driver.

According to another embodiment, a method includes the steps of receiving, from a driver associated with a device of the IHS, a request to access a Basic Input/Output System (BIOS) storage region of the HIS, and determining whether the device associated with the driver is a platform boot device. The method further includes facilitating access to a native bios storage region of the bios storage region by the driver when the boot device is a platform boot device, and not doing so otherwise.

According to yet another embodiment, a Basic I/O System (BIOS) has program instructions stored thereon that cause an IHS to receive, from a driver associated with an executable device of the IHS, a request to access a bios storage region of the IHS, determine whether the device associated with the driver is a platform boot device, and when the boot device is a platform boot device, facilitate access to a native bios storage region of the bios storage region by the driver, and when the boot device is not a platform boot device, facilitate access to an extended bios storage region of the bios storage region by the driver.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Embodiments of the present disclosure provide a Basic Input Output System (BIOS) storage extension system and method that allocates an extended storage space for BIOS variables used by the drivers of the IHS. When the BIOS storage extension system and method receives a request to access the BIOS storage region, it determines whether the process associated with the driver is a platform boot device, and if so, facilitates access to a native BIOS storage region of the BIOS storage region by the driver, and if not, facilitates access to an extended BIOS storage region of the BIOS storage region for use by the driver.

Currently, most UEFI BIOS implementations depend upon NVRAM storage in Serial Peripheral Interface (SPI) for customer settings. Most or all BIOS settings can be stored as NVRAM variables in allocated NVRAM space of approximately 768 Kilo-Bytes (KB). These customer fields, nevertheless, can be modified by anyone using UEFI variable services. That is, relatively little security impositions exist for NVRAM access, which can result in a big security threat for customer and platform data. A Split Boot architecture has been developed to move vendor specific driver data to extended storage to avoid year-over-year (YoY) growth of storage capacity. With such an architecture, however, there exists no secure and seamless techniques to efficiently manage the NVRAM store extension across SPI and NVMe devices.

Today access to NVRAM storage is available to all users at the Operating System (OS) level. Even though some variables may be encrypted, it does not restrict user from adding a new variables into NVRAM, particularly when many variables become stale (e.g., junk data) over time. Due to the potential result of NVRAM overflow violations, many BIOS systems do not allow new variable creation, even for a genuine application that may need it. Encrypted NVRAM variables protect only the variable data, but there exists no restriction from a malicious user (e.g., hacker) to overwrite the encrypted variable offset with malware content, which could result in Power On Self Test (POST) failures, such as boot path failures. Conventional systems use access commands, such as GetVariable and SetVariable to access variables in BIOS, but there exists no security mechanism for these access commands, and removing those commands could result in security exposure.

The issue of insufficient memory capacity of NVRAM storage can be a serious problem as access to NVRAM storage is restricted for dynamic data, and OS/VM applications may hang or experience unexpected behavior due to this violation. Insufficient memory may also force a system reboot, thus triggering a NVRAM reclaim operation to clean up any unused/deleted variables. Due to this NVRAM overflow vulnerability, the system may continually re-boot to perform the reclaim operation, while not allowing any genuine OS/VM operations. As will be described in detail herein below, embodiments of the present disclosure provide a BIOS storage extension system and method that allocates an extended storage space for BIOS variables used by the drivers of the IHS in which drivers that use the BIOS are authenticated before they are allowed access to such data.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Figure 1:
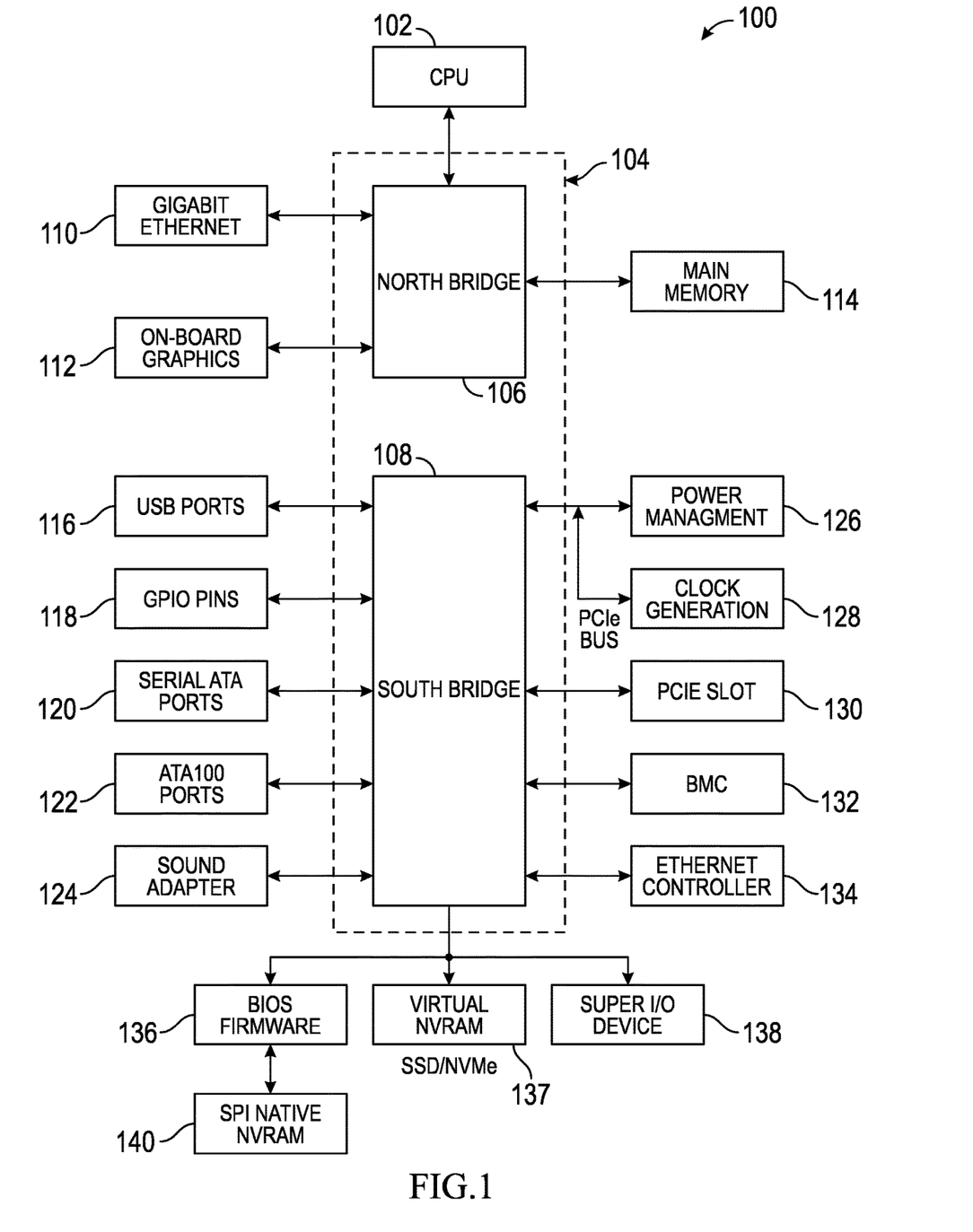
FIG. 1 shows an example of an IHS that may be configured to implement the BIOS storage extension system and method described herein.

FIG. 1 shows an example of an IHS configured to implement the BIOS storage extension system and method described herein. It should be appreciated that although certain embodiments described herein may be discussed in the context of a desktop or server computer, other embodiments may be utilized with virtually any type of IHS. Particularly, the IHS includes a baseboard or motherboard 100, which is a printed circuit board (PCB) to which components or devices are mounted to by way of a bus or other electrical communication path. For example, Central Processing Unit (CPU) 102 operates in conjunction with a chipset 104. CPU 102 is a processor that performs arithmetic and logic necessary for the operation of the IHS.

Chipset 104 includes northbridge 106 and southbridge 108. Northbridge 106 provides an interface between CPU 102 and the remainder of the IHS. Northbridge 106 also provides an interface to a random access memory (RAM) used as main memory 114 in the IHS and, possibly, to on-board graphics adapter 112. Northbridge 106 may also be configured to provide networking operations through Ethernet adapter 110. Ethernet adapter 110 is capable of connecting the IHS to another IHS (e.g., a remotely located IHS) via a network. Connections which may be made by Ethernet adapter 110 may include local area network (LAN) or wide area network (WAN) connections. Northbridge 106 is also coupled to southbridge 108.

Southbridge 108 is responsible for controlling many of the input/output (I/O) operations of the IHS. In particular, southbridge 108 may provide one or more universal serial bus (USB) ports 116, sound adapter 124, Ethernet controller 134, and one or more general purpose input/output (GPIO) pins 118. Southbridge 108 may also provide a bus for interfacing peripheral card devices such as BIOS boot system-compliant SCSI host bus adapter 130. In some embodiments, the bus may include a peripheral component interconnect (PCI) bus. Southbridge 108 may also provide baseboard management controller (BMC) 132 for use in managing the various components of the IHS. Power management circuitry 126 and clock generation circuitry 128 may also be utilized during operation of southbridge 108.

Additionally, southbridge 108 is configured to provide one or more interfaces for connecting mass storage devices to the IHS. For instance, in an embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an operating system (OS) and application programs.

An OS may comprise a set of programs that controls operations of the IHS and allocation of resources. An application program is software that runs on top of the OS and uses computer resources made available through the OS to perform application-specific tasks desired by the user.

Mass storage devices connected to southbridge 108 and SCSI host bus adapter 130, and their associated computer-readable media provide non-volatile storage for the IHS. Although the description of computer-readable media contained herein refers to a mass storage device, such as a hard disk or CD-ROM drive, it should be appreciated by a person of ordinary skill in the art that computer-readable media can be any available media on any memory storage device that can be accessed by the IHS. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by southbridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/firmware 136 that includes BIOS program code containing the basic routines that help to start up the IHS and to transfer information between elements within the IHS. BIOS/firmware 136 comprises firmware compatible with the Extensible Firmware Interface (EFI) Specification and Framework.

The LPC interface may also be utilized to connect virtual NVRAM 137 (e.g., SSD/NVMe) to the IHS. The virtual NVRAM 137 may be utilized by BIOS/firmware 136 to store configuration data for the IHS. In other embodiments, configuration data for the IHS may be stored on the same virtual NVRAM 137 as BIOS/firmware 136. The HIS 100 may also include a SPI native NVRAM 140 coupled to the BIOS 136.

BMC 132 may include non-volatile memory having program instructions stored thereon that enable remote management of the IHS. For example, BMC 132 may enable a user to discover, configure, and manage the IHS, setup configuration options, resolve and administer hardware or software problems, etc. Additionally or alternatively, BMC 132 may include one or more firmware volumes, each volume having one or more firmware files used by the BIOS' firmware interface to initialize and test components of the IHS.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state because iDRAC is embedded within the IHS from the factory.

It should be appreciated that, in other embodiments, the IHS may comprise other types of computing devices, including hand-held computers, embedded computer systems, personal digital assistants, and other types of computing devices. It is also contemplated that the IHS may not include all of the components shown in FIG. 1, may include other components that are not explicitly shown in FIG. 1, or may utilize a different architecture.

Figure 2:
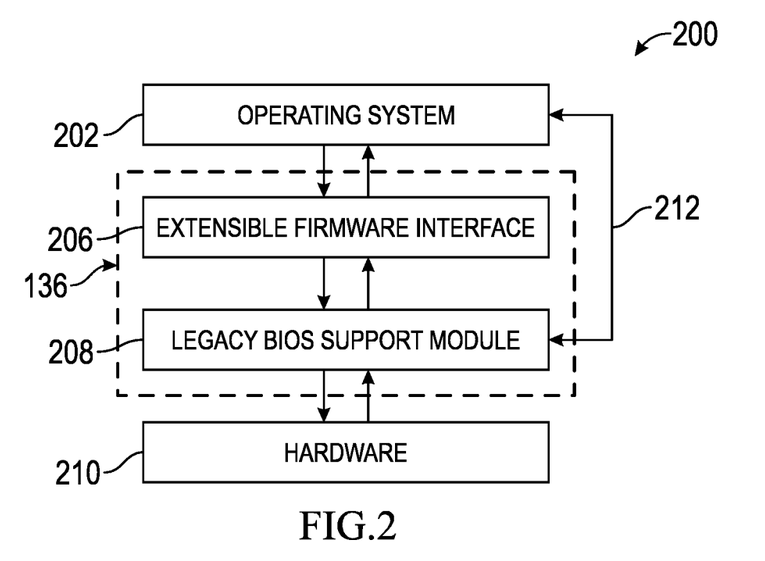
FIGS. 2 and 3 are block diagrams of examples of aspects of Basic Input/Output (BIOS) or Extensible Firmware Interface (EFI) firmware configured to implement systems and methods, according to one embodiment of the present disclosure.

Referring now to FIG. 2, examples of aspects of an EFI environment created by BIOS/firmware 136 of the IHS are described. As shown, BIOS/firmware 136 comprises firmware compatible with the EFI Specification from INTEL CORPORATION or from the UEFI FORUM. The EFI Specification describes an interface between OS 202 and BIOS/firmware 136. Particularly, the EFI Specification defines the interface that BIOS/firmware 136 implements and the interface that OS 202 may use in booting.

According to an implementation of EFI, both EFI 206 and legacy BIOS support module 208 may be present in BIOS/firmware 136. This allows the IHS to support both firmware interfaces. In order to provide this, interface 212 may be used by legacy OSs and applications. Additional details regarding the architecture and operation of the EFI 206 are provided below with respect to FIG. 3.

Figure 3:
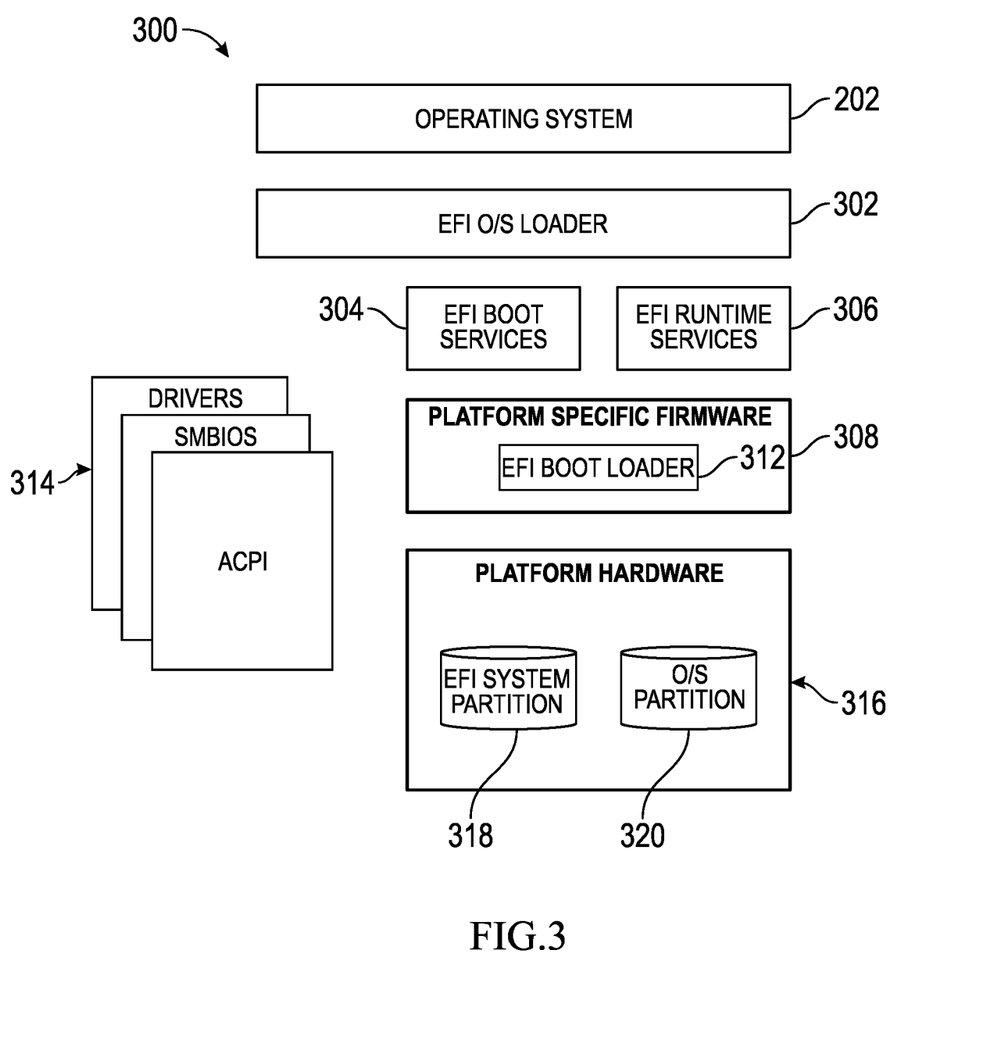

FIG. 3 provides additional details regarding an EFI Specification-compliant system 300 utilized to provide an operating environment to facilitate initialization and reconfiguration of replacement motherboards. As shown, system 300 includes platform hardware 316 and OS 202. Platform firmware 308 may retrieve an OS image from EFI system partition 318 using an EFI 0/S loader 302. EFI system partition 318 may be an architecturally shareable system partition. As such, EFI system partition 318 defines a partition and file system that are designed to allow safe sharing of mass storage between multiple vendors. 0/S partition 320 may also be utilized.

Once started, EFI 0/S loader 302 continues to boot the complete OS 202. In doing so, EFI 0/S loader 302 may use EFI boot services 304 and interface to other supported specifications to survey, comprehend, and initialize the various platform components and the operating system software that manages them. Thus, drivers 314 from other specifications may also be present on system 300. For example, the Advanced Configuration and Power Management Interface (ACPI) and the System Management BIOS (SMBIOS) specifications may be supported.

EFI boot services 304 provide interfaces for devices and system functionality that can be used during boot time. EFI runtime services 306 may also be available to the O/S loader 302 during the boot phase. For example, a minimal set of runtime services may be presented to ensure appropriate abstraction of base platform hardware resources that may be needed by the operating system 202 during its normal operation. EFI allows extension of platform firmware by loading EFI driver and EFI application images which, when loaded, have access to EFI-defined runtime and boot services.

Various program modules provide the boot and runtime services. These program modules may be loaded by the EFI boot loader 312 at system boot time. EFI boot loader 312 is a component in the platform specific firmware 308 that determines which program modules should be explicitly loaded and when. Once the platform specific firmware 308 is initialized, it passes control to boot loader 312. Boot loader 312 is then responsible for determining which of the program modules to load and in what order.

In that context, UEFI Secure Boot is an industry-standard mechanism in the system BIOS for authenticating pre-boot code modules (e.g., device drivers or other software or firmware code). The UEFI specification defines data structures and logic for the authentication process. The BIOS maintains a Secure Boot policy having X.509 certificates, public keys, and image digests. The BIOS enforces the Secure Boot policy for each pre-boot code module that loads during the boot process. If a pre-boot code module cannot be authenticated or does not otherwise satisfy the Secure Boot policy, the BIOS does not load that module.

Figure 4:
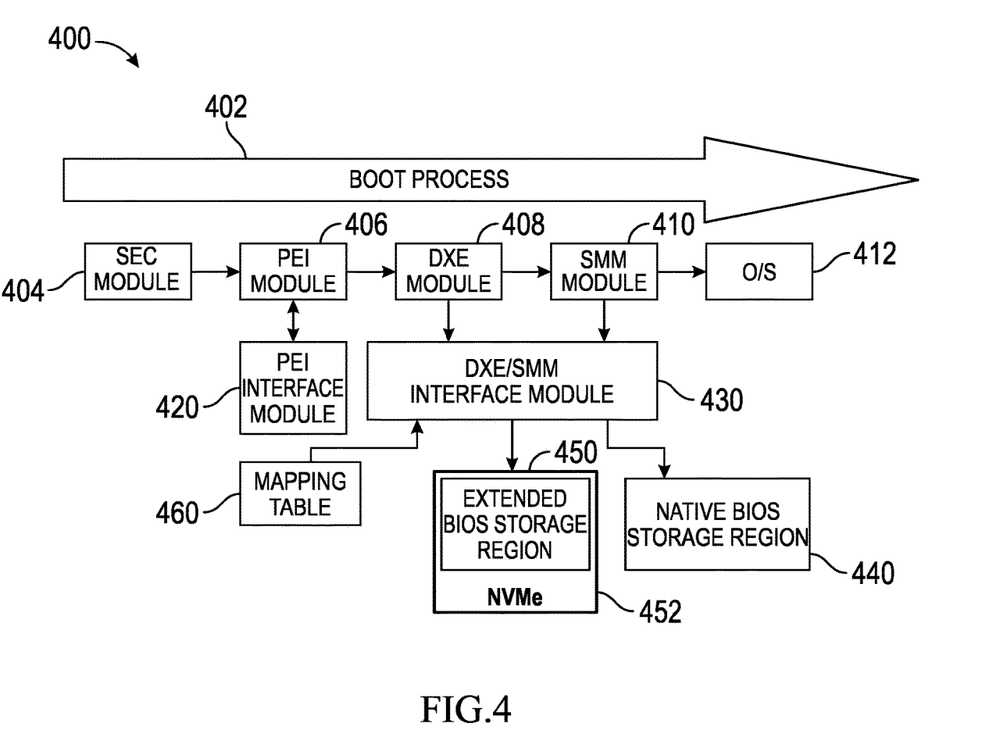
FIG. 4 illustrates an example BIOS storage extension system that may be used for secure and seamless access by various boot architectures according to one embodiment of the present disclosure.

FIG. 4 illustrates an example BIOS storage extension system 400 that may be used for secure and seamless access by various boot architectures according to one embodiment of the present disclosure. The system 400 generally includes a boot process 402, such as a UEFI boot process, that takes place in multiple phases, such as a Security (SEC) phase performed by a SEC module 404, a Pre-EFI Initialization (PEI) phase performed by a PEI module 406, a driver execution environment (DXE) phase performed by a DXE module 408, and a Systems Management Mode (SMM) phase performed by a SMM module 410 on an IHS, such as IHS 100 of FIG. 1. The boot process 402 may also include an Operating System (OS) phase executed by an OS 412, which is loaded and started on the IHS 100. The SEC module 404, PEI module 406, DXE module 408, and SMM module 410 may collectively form a BIOS/Firmware 136 as shown in FIG. 1. In this context, the BIOS/Firmware 136 should be construed as encompassing at least the boot block as that term is defined above. In some embodiments, the BIOS/Firmware 136 may also include other components of the BIOS and even all of the BIOS. However, in some implementations, some components that may be considered as being part of the BIOS may be stored in other locations.

The system 400 also includes a native BIOS storage region 440 and an extended BIOS storage region 450 that may be collectively referred to as a BIOS storage region used by the SEC module 404, PEI module 406, DXE module 408, and SMM module 410. In one embodiment, the extended BIOS storage region 450 comprises a hidden partition created on an NVMe storage unit 452.

According to embodiments of the present disclosure, the system includes a PEI interface module 420 and a DXE/SMM interface module 430. The PEI Interface module 420 creates a secured layer on top of the PEI module 406 to provide a mechanism for authenticating drivers 314 (e.g., callers). When any driver 314 attempts to access (e.g., read, write, etc.) to either of the native BIOS storage region 440 and/or extended BIOS storage region 450, it will validate the input parameters and authenticate the driver 314 to ensure that the driver 314 is authorized to access the native BIOS storage region 440 and/or extended BIOS storage region 450 before allowing access. The PEI interface module 420 may also determine if the driver is associated with a platform process. Within this disclosure, a platform process may be any process executed on the IHS 100 that establishes an environment for executing the OS 412 on the IHS 100. Examples of such platform processes may include security processes (e.g., public key distribution), setup mode, boot mode, secure boot variables, key default values, platform essential vendor keys, and the like, while other non-platform processes may include virtual secure NVRAM variables used by virtual machines (VMs), third party vendor drivers, and other DXE drivers, and/or SMM drivers.

When the PEI interface module 420 authenticates each driver 314 during the boot process 402, it may store information about the driver 314 in a mapping table 460. The mapping table 460 may then be used by ensuing modules (e.g., DXE module 408 and SMM module 410) to ensure that only authenticated drivers 314 are allowed access to the BIOS storage region. Additionally, the mapping table 460 stores the driver variables at specified offset values so that each variable may be traceable to its associated driver 314.

Figure 5A:
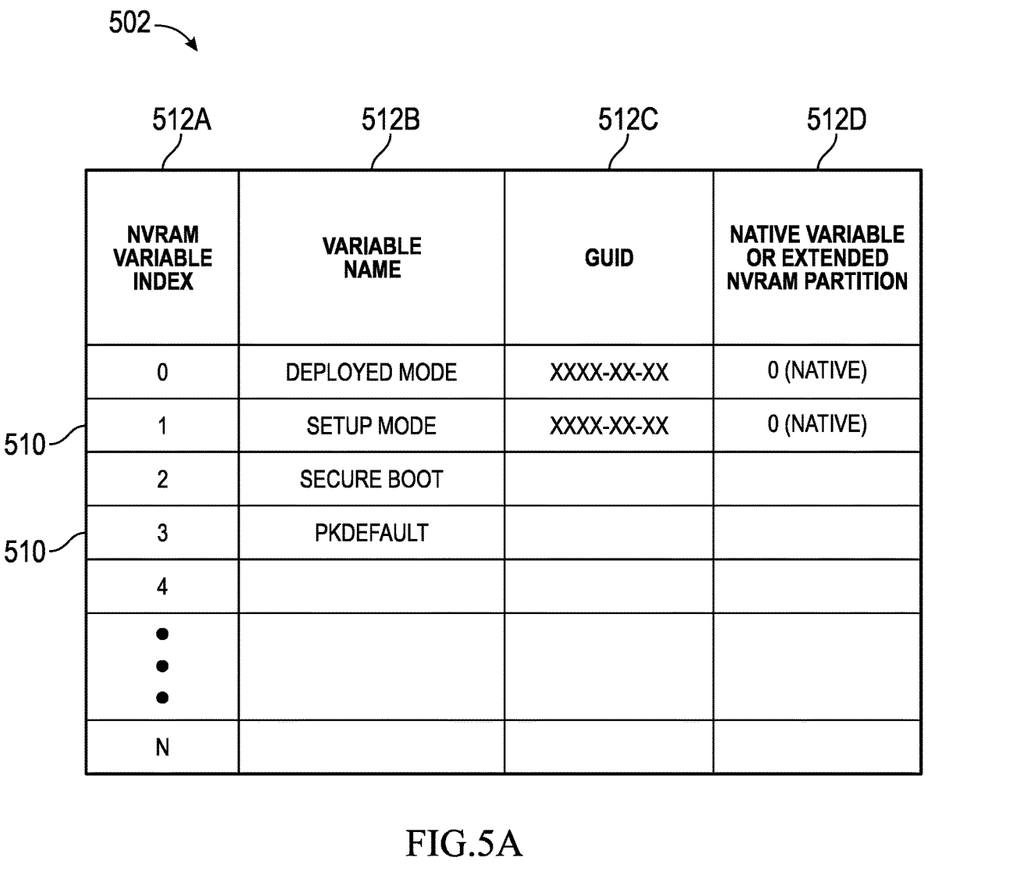
FIGS. 5A and 5B illustrate example pages of a mapping table that may be used by the BIOS storage extension system according to one embodiment of the present disclosure.
Figure 5B:
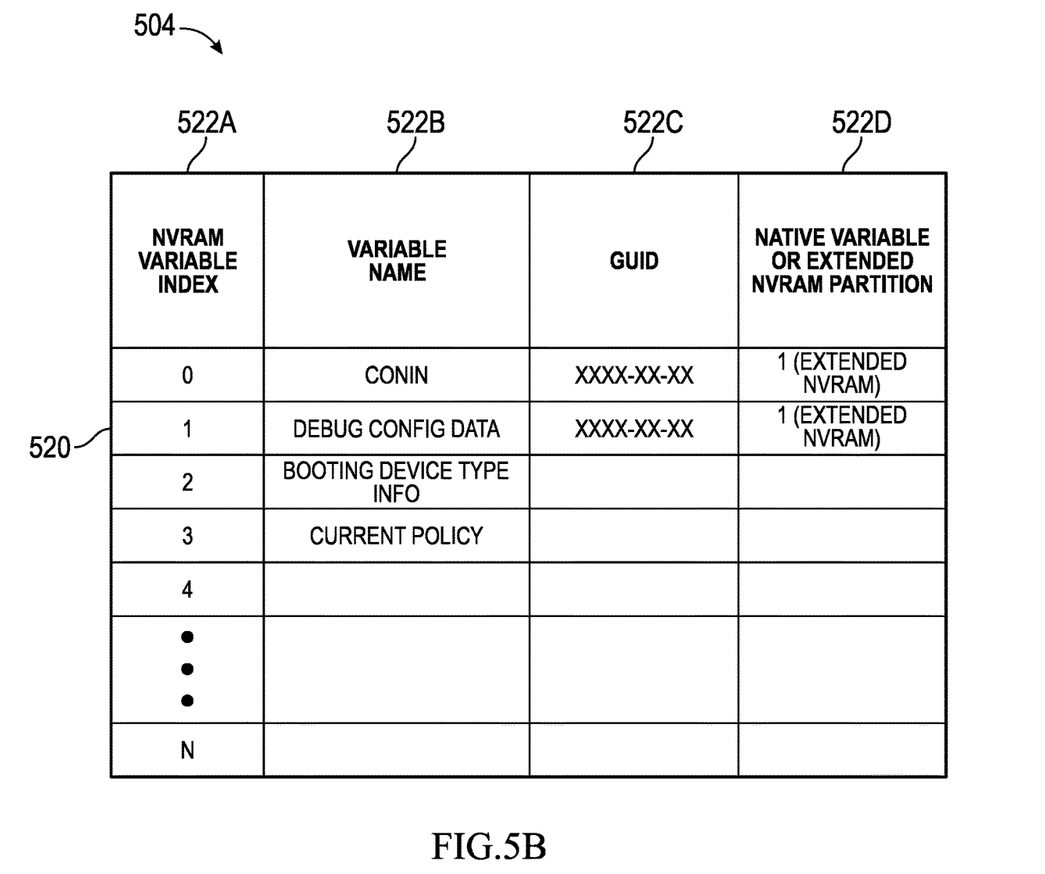

FIGS. 5A and 5B illustrate an example mapping table 460 that may be used by the BIOS storage extension system 400 according to one embodiment of the present disclosure. In particular, FIG. 5A illustrates a first page 502 of the mapping table 460 that is populated with information associated with platform processes, while FIG. 5B illustrates a second page 504 of the mapping table 460 that is populated with information associated with non-platform processes. While the present embodiment shows separate pages 502, 504 for platform processes, and non-platform processes, respectively, it should be appreciated that the mapping table 460 may be implemented in other forms without deviating from the spirit and scope of the present disclosure. For example, it is contemplated that the mapping table 460 be implemented with a single page in which both information associated with platform processes and non-platform processes are stored.

Each page 502, 504 of the mapping table 460 includes rows 510, 520 in which each row 510, 520 stores information about one driver 314. Each page 502, 504 of the mapping table 460 also includes a variable index column 512a, 522a a variable name column 512b, 522b, a Global Universal Identifier (GUID) column 512c, 522c, and a BIOS storage region 512d, 522d indicating whether the variables associated with the driver 314 are stored in the native BIOS storage region 440 or the extended BIOS storage region 450. The GUID column 512c, 522c stores unique identifiable information about its associated driver 314. As such, the BIOS storage extension system 400 may include processes to periodically evaluate the trusted variable services provided by any non-used drivers 314 so that they can be marked for dynamic cleanup without a reboot.

Figure 6A:
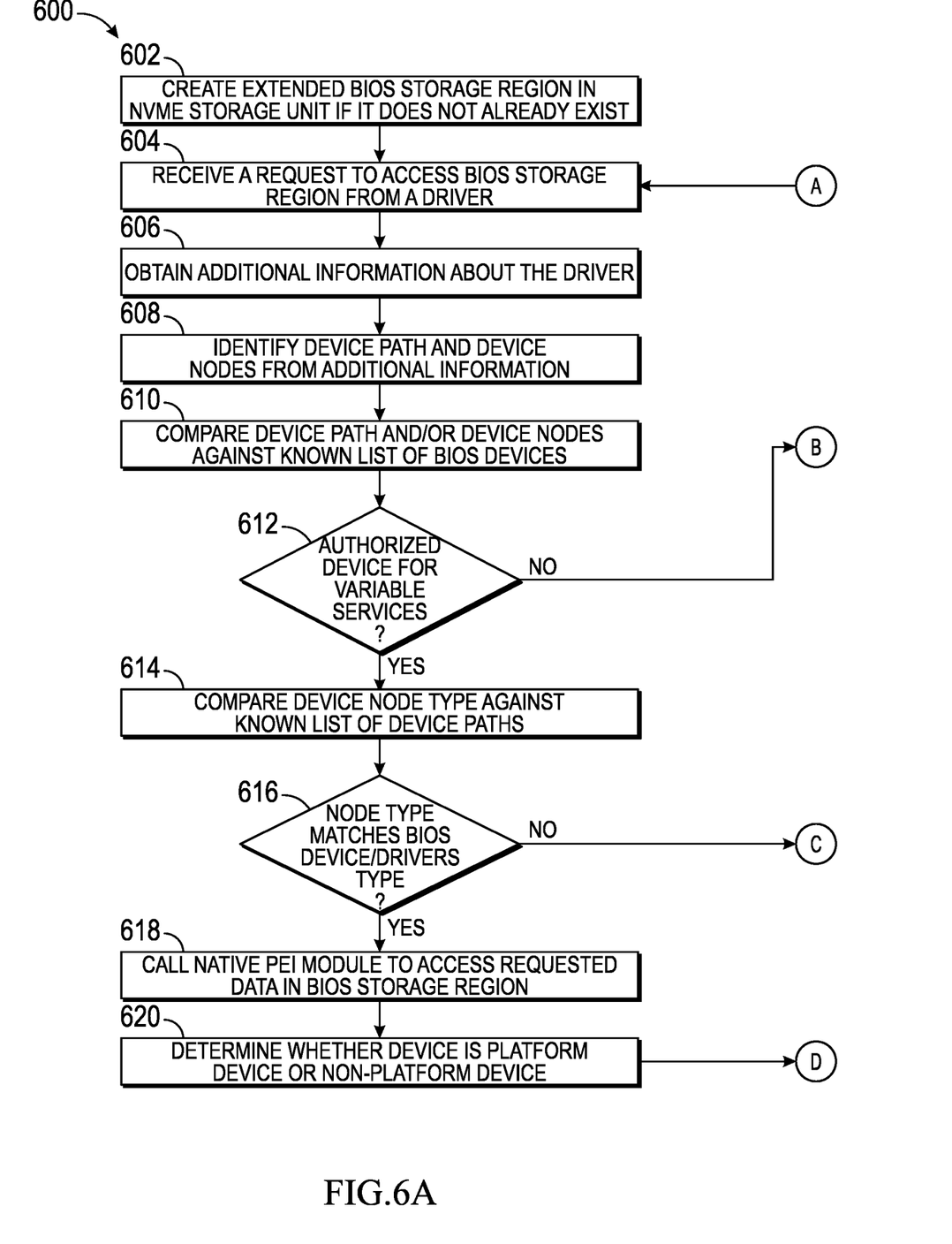
FIGS. 6A and 6B illustrate an example Pre-EFI Initialization (PEI) phase BIOS storage extension method that may be provided for allocating an extended storage space for BIOS variables used by the drivers of the IHS according to one embodiment of the present disclosure.
Figure 6B:
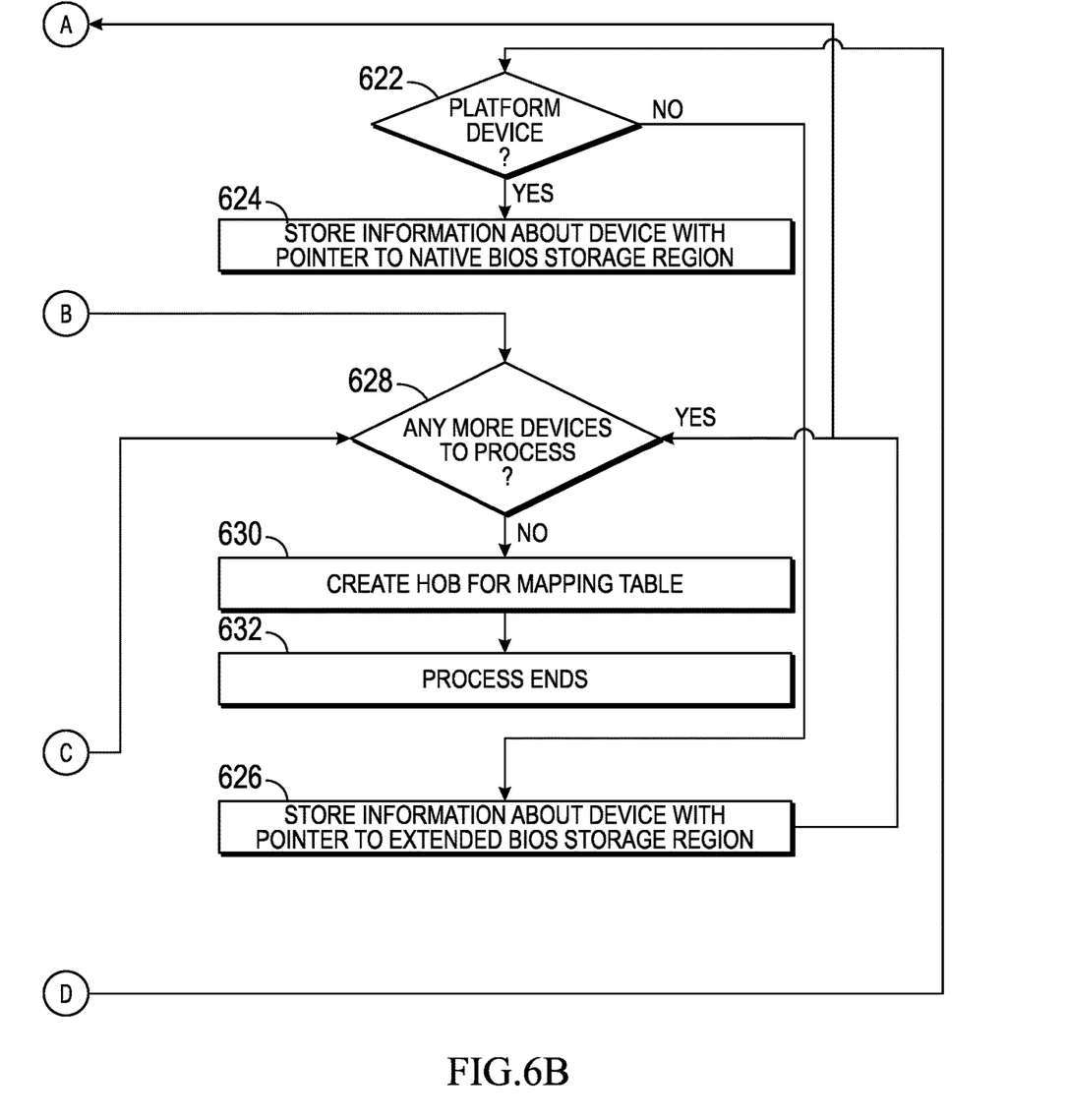

FIGS. 6A and 6B illustrate an example PEI phase BIOS storage extension method 600 that may be provided for allocating an extended storage space for BIOS variables used by the drivers of the IHS according to one embodiment of the present disclosure. Additionally or alternatively, the PEI phase BIOS storage extension method 600 may be performed in whole or in part by the PEI module 406 and/or PEI interface module 420 configured in the IHS 100. Initially, the IHS 100 is configured with a NVMe storage unit 452, and a boot process is started on the IHS in which the SEC module 404 has completed its processing and has handed off further processing to the PEI module 406.

At step 602, the method 600 creates an extended BIOS storage region 450 in the NVMe storage unit 452 if it does not already exist. For example, during an initial boot operation performed on the IHS 100, the PEI interface module 420 may determine whether the extended BIOS storage region 450 does not yet exist on the NVMe storage unit 452 and if so, create the extended BIOS storage region 450 on the NVMe storage unit 452. Such a scenario may exist during initial turn up of the IHS 100 following its physical configuration, or when the IHS 100 is re-booted with a newly installed NVMe storage unit 452 that has not yet been configured with the extended BIOS storage region 450.

At step 604, the method 600 receives a request to access the BIOS storage region from a driver 314. The method then obtains additional information about the driver 314 at step 606. For example, the method 600 may obtain the information by issuing a command (e.g., EFI COMPONENT NAME2 PROTOCOL) to get the driver (e.g., caller) details, such as the caller driver or controller name. Using the obtained information, the method 600 may then identify the device path and associated device nodes from the additional information at step 608. For example, the method 600 may identify the device path and nodes by parsing the information obtained as a result of the EFI COMPONENT NAME2 PROTOCOL command.

At step 610, the method 600 compares the device path and/or device nodes against known list of BIOS devices. Thereafter at step 612 determines if the driver 314 is associated with an authorized device for variable services. If so, processing continues as step 614; otherwise, processing continues at step 628 to process requests from other drivers 314.

At step 614, the method 600 compares the device node type against known list of device paths. In one embodiment, the method 600 may get the device path of the called driver or module, and based on its device path and associated nodes, it will validate the device with its node types. For example, the method 600 may access a device path node structure table 700 (See FIG. 7) to identify the node structure that should be associated with the device path, and if it does not match (e.g., calling driver is a USB type meaning that the caller is from a UEFI shell application or some other form of media), the method 600 will return the request as invalid (e.g., unsupported driver). Examples of valid device paths may include BIOS drivers, such as DXE, SMM, or ACPI callbacks in which the device path usually matches its node structure. Devices such as these would be authenticated by the method. Thereafter at step 616, the method 600 determines whether the node type matches the BIOS device/drivers type. If so, processing continues as step 618; otherwise, processing continues at step 628 to process requests from other drivers 314.

At step 618, the method 600 calls the native PEI module 406 to access the requested data in BIOS storage region. Then at step 620, the method 600 determines whether the requesting device is a platform device or non-platform device. As mentioned previously, a platform device may be one that establishes an environment for executing the OS 412 on the IHS 100, while a non-platform device may be, for example, virtual secure NVRAM variables used by virtual machines (VMs), third party vendor drivers, and other DXE drivers, and/or SMM drivers. If the method 600 at step 622 determines that the requesting driver 314 is a platform device, processing continues at step 624 to store information about device with pointer to native BIOS storage region 440; otherwise, processing continues at step 626 to store information about device with pointer to extended BIOS storage region 450.

At step 628, method 600 determines whether any more devices are to be processed. If so, processing continues as step 604; otherwise, processing continues at step 630 to create a hand over block (HOB) for the mapping table.

The method 600 as described above can be repeatedly performed to process requests for drivers 314 to allocate storage for their variables in either of the native BIOS storage region 440 or extended BIOS storage region 450. Nevertheless, when use of the PEI phase BIOS storage extension method 600 is no longer needed or desired, the process ends at step 632.

Figure 7:
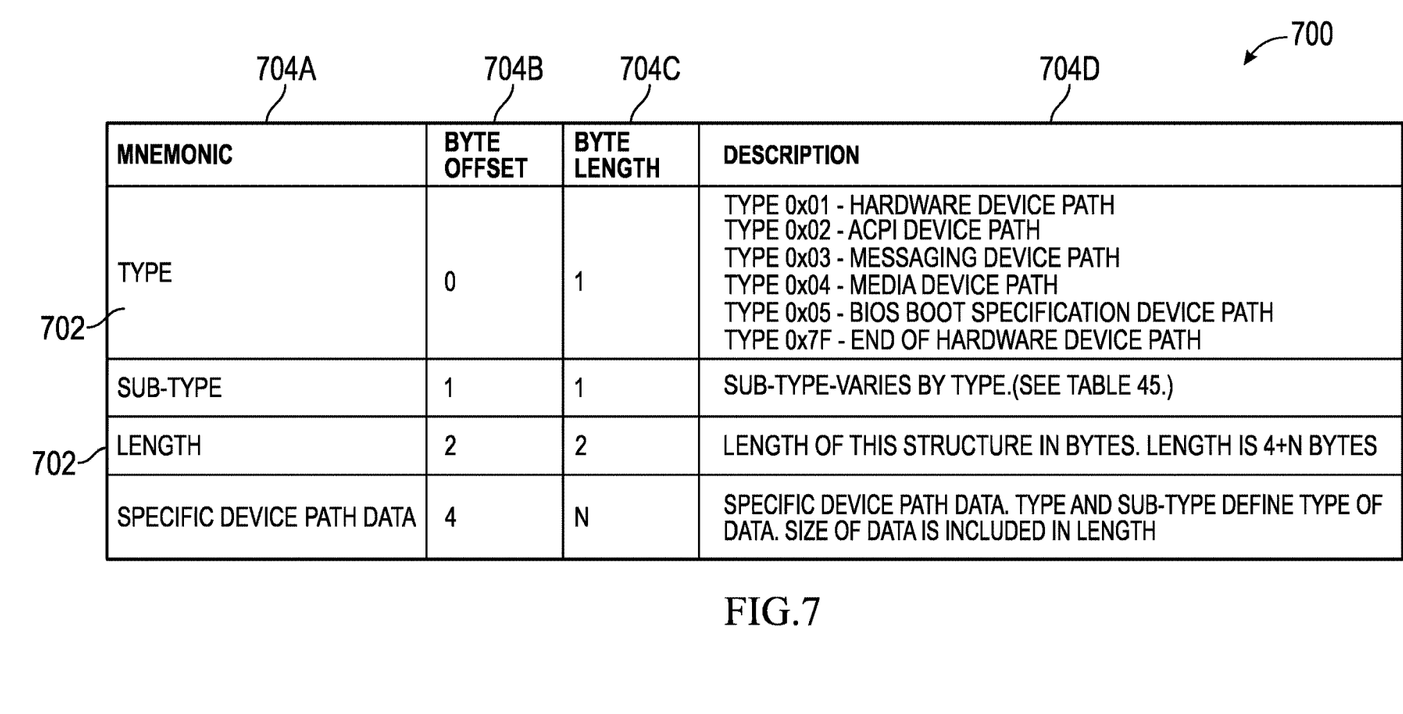
FIG. 7 illustrates an example device path node structure table that may be used by the BIOS storage extension system according to one embodiment of the present disclosure.

FIG. 7 illustrates an example device path node structure table 700 that may be used by the BIOS storage extension system 400 according to one embodiment of the present disclosure. In general, the device path node structure table 700 comprises a portion of a table depicting a specified structure for devices (e.g., nodes) and their associated device paths to be used for communicating with a BIOS of the IHS 100.

The device path node structure table 700 includes rows 702 indicating a particular structure for each device path. The device path node structure table 700 also includes a mnemonic column 704a, a byte offset column 704b, a byte length column 704c, and a description column 704d for storing a description associated with the information included in the mnemonic column 704a. In particular, the byte offset column 704b and byte length column 704c indicate a portion of a device path that should be expected based upon the device type. Thus, if a certain device requesting service from the system 400 complies with this structure, it may be presumed to be authentic; otherwise, the device would not be presumed to be authentic.

Figure 8:
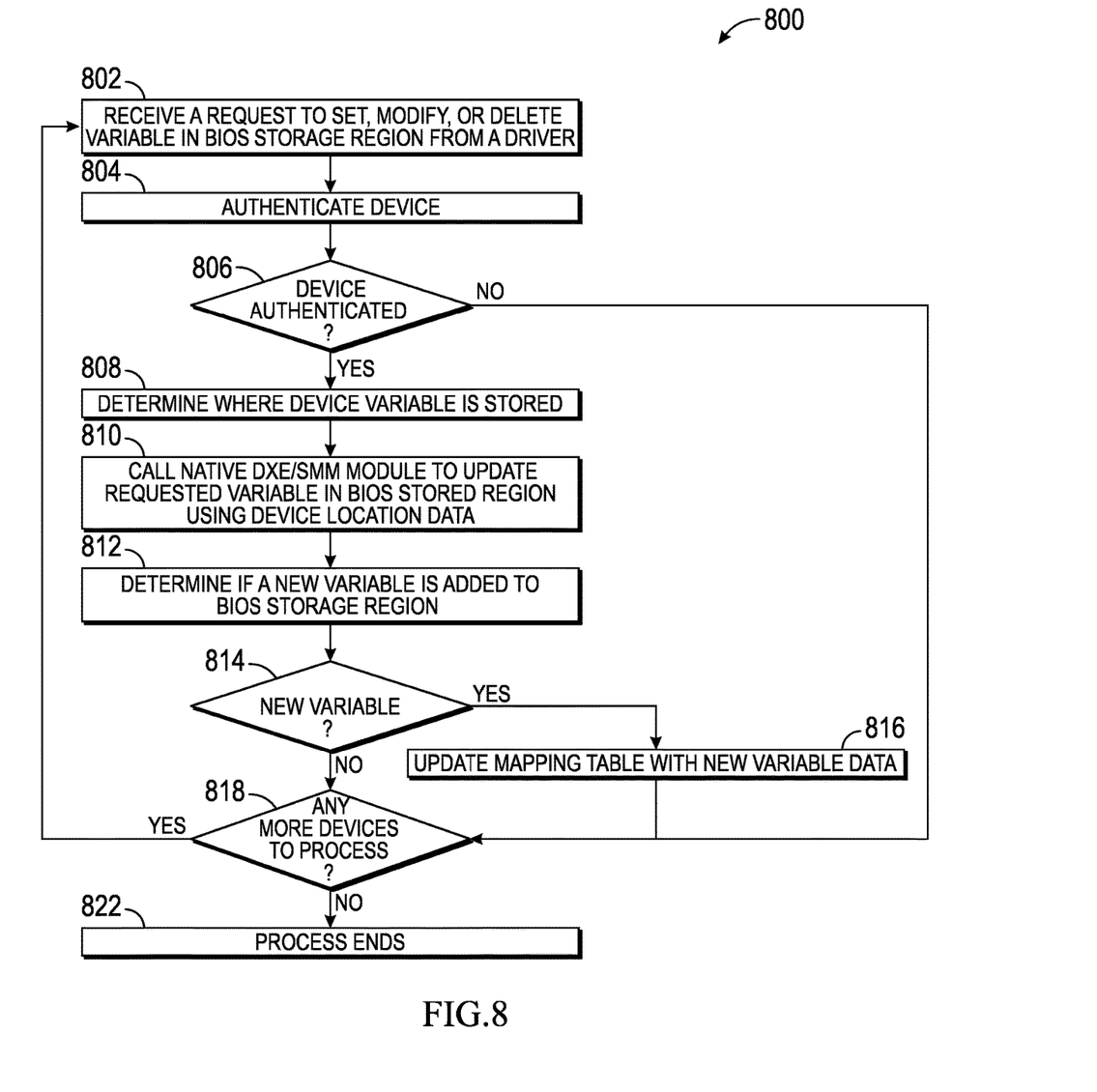
FIG. 8 illustrates an example Driver Execution Environment/Systems Management Mode (DXE/SMM) phase BIOS storage extension method that may be provided for updating variables by valid drivers using the mapping table according to one embodiment of the present disclosure.

FIG. 8 illustrates an example DXE/SMM phase BIOS storage extension method 800 that may be provided for updating variables by valid drivers using the mapping table 460 according to one embodiment of the present disclosure. Additionally or alternatively, the DXE/SMM phase BIOS storage extension method 800 may be performed in whole or in part by the DXE/SMM interface module 430, DXE module 408, and/or SMM module 410 configured in the IHS 100. Initially, the method 600 of FIG. 6 has been performed to allocate memory for the native BIOS storage region 440 and extended BIOS storage region 450, and generate the mapping table 460 as described above with reference to FIG. 6.

At step 802, the method 800 receives a request to set, modify, or delete one or more variables in the BIOS storage region from a driver 314. Thereafter at step 804, the method 800 authenticates the driver 314. In one embodiment, the method 800 authenticates the driver 314 in an at least somewhat similar manner to how the driver 314 was authenticated at steps 606-614 as described above with reference to FIG. 6. At step 806, if the driver 314 is authenticated, processing continues at step 808; otherwise, processing continues at step 818.

At step 808, the method 800 determines where the variable to be set, modified, or deleted is stored. For example, the method 800 may access the mapping table 460 to determine whether the variable is stored in the native BIOS storage region 440 or the extended BIOS storage region 450. The method 800 then calls the native DXE module 408 or SMM module 410 to update requested variable in the BIOS storage region using the obtained device location data at step 810.

At step 812, the method 800 determines if a new variable is to be added to the BIOS storage region. In such a case, the mapping table should be updated to reflect the addition of the new variable. Thus at step 814, if the method 800 determines that a new variable is to be added; processing continues at step 816 to update the mapping table with the new variable data; otherwise, processing continues at step 818.

At step 818, the method 800 determines whether any other drivers 314 requests to set, modify, or delete one or more variables in the BIOS storage region. If so, processing continues at step 802 to process the next request, and alternatively if no other devices are requesting service, processing continues at step 822 in which the process ends.

Although FIGS. 6 and 8 describe example methods 600, 800 that may be performed to selectively store variables in either the native BIOS storage region 440 or extended BIOS storage region 450, the features of either method 600, 800 may be embodied in other specific forms without deviating from the spirit and scope of the present disclosure. For example, either of the methods 600, 800 may perform additional, fewer, or different operations than those described in the present examples. For another example, either of the methods 600, 800 may be performed in a sequence of steps different from that described above. As yet another example, certain steps of either method 600, 800 may be performed by other components in the IHS 100 other than those described above.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a Basic Input/Output System (BIOS) coupled to the processor, the BIOS having program instructions stored thereon that, upon execution, cause the IHS to:
receive, from a driver associated with an executable device of the IHS, a request to access a bios storage region of the IHS;
authenticate that the driver is authorized to access the bios storage region;
when the driver is authorized, allow the driver to access the bios storage region; and
when the driver is not authorized, inhibit the driver from accessing the bios storage region;
determine whether the device associated with the driver is a platform boot device;
when the boot device is a platform boot device, facilitate access to a native bios storage region of the bios storage region by the driver; and
when the boot device is not a platform boot device, facilitate access to an extended bios storage region of the bios storage region by the driver.

2. The IHS of claim 1, wherein the program instructions, upon execution, further cause the IHS to:
authenticate the driver by verifying a device path of the driver matches a node type associated with the driver.

3. The IHS of claim 1, wherein the program instructions, upon execution, further cause the IHS to:
authenticate that the driver is authorized to access the bios storage region during a PEI portion of a boot device of the IHS; and
allow the driver to access the bios storage region during at least one of a DXE and a SMM portion of the boot device.

4. The IHS of claim 3, wherein the program instructions, upon execution, further cause the IHS to:
store the results of the authentication in a hand off block (HOB) by the PEI portion; and
allow the access to the bios storage region according to the authentication results stored in the HOB.

5. The IHS of claim 1, wherein the program instructions, upon execution, further cause the IHS to:
create the extended bios storage region of the bios storage region as a hidden partition of the NVMe storage device.

6. The IHS of claim 5, wherein the program instructions, upon execution, further cause the IHS to:
create a backup bios storage region in the hidden partition of the NVMe storage device during a first successful boot device of the IHS; and
when the driver fails during a second boot device of the IHS, replace one or more variables accessed by the driver during the second boot device with the associated variables accessed during the first boot device.

7. The IHS of claim 6, wherein the program instructions, upon execution, further cause the IHS to:
store the variables according to a unique identifier in the backup bios storage region to identify the associated variables accessed during the first boot device, wherein the variables are stored in a hand off block (HOB) portion of the bios storage region.

8. The IHS of claim 6, wherein the program instructions, upon execution, further cause the IHS to:
replace one or more variables accessed by the driver during the second boot device without requiring the IHS to undergo a re-boot device.

9. A method comprising:
receiving, from a driver associated with a device of the IHS, a request to access a Basic Input/Output System (BIOS) storage region of the IHS;
authenticating that the driver is authorized to access the bios storage region;
when the driver is authorized, allowing the driver to access the bios storage region; and
when the driver is not authorized, inhibiting the driver from accessing the bios storage region;
determining whether the device associated with the driver is a platform boot device;
when the boot device is a platform boot device, facilitating access to a native bios storage region of the bios storage region by the driver; and
when the boot device is not a platform boot device, facilitating access to an extended bios storage region of the bios storage region by the driver.

10. The method of claim 9, further comprising:
authenticating the driver by verifying a device path of the driver matches a node type associated with the driver.

11. The method of claim 9, further comprising:
authenticating that the driver is authorized to access the bios storage region during a PEI portion of a boot device of the IHS; and
allowing the driver to access the bios storage region during at least one of a DXE and a SMM portion of the boot device.

12. The method of claim 11, further comprising:
storing the results of the authentication in a hand off block (HOB) by the PEI portion; and
allowing the access to the bios storage region according to the authentication results stored in the HOB.

13. The method of claim 9, further comprising:
creating the extended bios storage region of the bios storage region as a hidden partition of the NVMe storage device.

14. The method of claim 13, further comprising:
creating a backup bios storage region in the hidden partition of the NVMe storage device during a first successful boot device of the IHS; and
when the driver fails during a second boot device of the IHS, replacing one or more variables accessed by the driver during the second boot device with the associated variables accessed during the first boot device.

15. The method of claim 14, further comprising:
storing the variables according to a unique identifier in the backup bios storage region to identify the associated variables accessed during the first boot device, wherein the variables are stored in a hand off block (HOB) portion of the bios storage region.

16. A Basic I/O System (BIOS) having program instructions stored thereon that, upon execution by an Information Handling System (IHS), cause the IHS to:
receive, from a driver associated with an executable device of the IHS, a request to access a bios storage region of the IHS;
authenticate that the driver is authorized to access the bios storage region;
when the driver is authorized, allow the driver to access the bios storage region; and
when the driver is not authorized, inhibit the driver from accessing the bios storage region;
determine whether the device associated with the driver is a platform boot device;
when the boot device is a platform boot device, facilitate access to a native bios storage region of the bios storage region by the driver; and
when the boot device is not a platform boot device, facilitate access to an extended bios storage region of the bios storage region by the driver.

17. The BIOS of claim 16, wherein the program instructions, upon execution, further cause the IHS to:
authenticate that the driver is authorized to access the bios storage region during a PEI portion of a boot device of the IHS; and
allow the driver to access the bios storage region during at least one of a DXE and a SMM portion of the boot device.

* * * * *